US007424841B2

(12) United States Patent
Liu

(10) Patent No.: US 7,424,841 B2
(45) Date of Patent: Sep. 16, 2008

(54) DEVICE FOR LOCKING AND RELEASING A SCREW BIT

(76) Inventor: Kuo-Chen Liu, P.O. Box 215, Taichung (TW) 40099

( * ) Notice: Subject to any disclaimer, the term of this patent is extended or adjusted under 35 U.S.C. 154(b) by 0 days.

(21) Appl. No.: 11/604,320

(22) Filed: Nov. 27, 2006

(65) Prior Publication Data

US 2008/0072718 A1 Mar. 27, 2008

(30) Foreign Application Priority Data

Sep. 25, 2006 (TW) .............................. 95217078 U

(51) Int. Cl.
*B23B 31/12* (2006.01)
*B23B 5/22* (2006.01)
*B23B 23/00* (2006.01)

(52) U.S. Cl. .............................. 81/438; 81/125; 279/22

(58) Field of Classification Search ................... 81/438, 81/436, 451, 429, 439, 125; 279/22, 30, 279/82, 905
See application file for complete search history.

(56) References Cited

U.S. PATENT DOCUMENTS 5,996,452 A * 12/1999 Chiang ........................ 81/429
6,270,085 B1 * 8/2001 Chen et al. ..................... 279/22
6,637,755 B2 * 10/2003 Chen et al. .................. 279/905
6,973,858 B2 * 12/2005 Huang ......................... 81/438
7,096,768 B1 * 8/2006 Chen ........................... 81/438
7,114,728 B2 * 10/2006 Chen ........................... 279/24
7,287,449 B2 * 10/2007 Abel et al. .................... 81/438
2004/0255732 A1 * 12/2004 Lin ............................. 81/438

* cited by examiner

*Primary Examiner*—Hadi Shakeri

(57) ABSTRACT

A screw bit positioning device includes a tube which has a first hole and a second hole respectively defined through a wall thereof so that a first bead and a second bead are respectively engaged the first and second holes. A movable member is movably received in the passage and located between a stop and a first spring. A sleeve is movably mounted to the tube and cooperates with a second spring mounted on the tube such that when the sleeve is moved, the first and second beads are simultaneously pressed into the tube or received in two respective spaces in the inner periphery of the sleeve. The screw bit and the movable member are positioned when the first and second beads are merged into the tube. When the first and second beads are released, the screw bit is pushed out from the tube by the first spring.

2 Claims, 4 Drawing Sheets

DEVICE FOR LOCKING AND RELEASING A SCREW BIT

FIELD OF THE INVENTION

The present invention relates to a device for locking a screw bit to a tube and for biasing the screw bit out from the tube.

BACKGROUND OF THE INVENTION

A conventional connection device for locking a screw bit to a tube generally includes a bead which movably engaged with a hole defined through a wall of the tube so as to contact against an outer surface of the screw bit to secure the screw bit. When the screw bit is to be removed from the tube, the bead is slightly moved outward from the hole so that the user pulls the screw bit out from the tube. It is experienced that the screw bit might be firmly engaged with the tube during operation so that the user is difficult to pull the screw bit out, especially when oil or grease are attached on the user's fingers. Some connection for locking the screw includes multiple parts and a complicated structure which increases the manufacturing cost.

The present invention intends to provide a device for locking a crew bit firmly to a tube and for biasing the screw bit from the tube.

SUMMARY OF THE INVENTION

The present invention relates to a screw bit positioning device which comprises a tube having a passage defined axially therethrough and a screw bit is engaged with a polygonal inner periphery in a first end of the tube. A first hole and a second hole are respectively defined through a wall of the tube. A C-shaped clamp is securely mounted on the tube and located between the first and second holes. A first bead is movably engaged with the first hole and a second bead is movably engaged with the second hole. A movable member is movably received in the passage and has a first end facing the first end of the tube. A first spring is received in the tube and has a first end contacting a second end of the movable member. A second end of the first spring contacts an end of a connection rod inserted into the second end of the tube. The movable member has a groove defined in an outer periphery thereof.

A sleeve is movably mounted to the tube and a flange extends from an inner periphery of the sleeve so as to define a first space and a second space. The first hole communicates with the first space and the second hole communicates with the second space. The C-shaped clamp is located in the second space and a second spring is mounted to the tube and biased between the C-shaped clamp and the flange. A collar is securely connected to the sleeve and engaged with the second space.

The primary object of the present invention is to provide a screw bit positioning device wherein the screw bit is pushed out from the tube by a spring.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
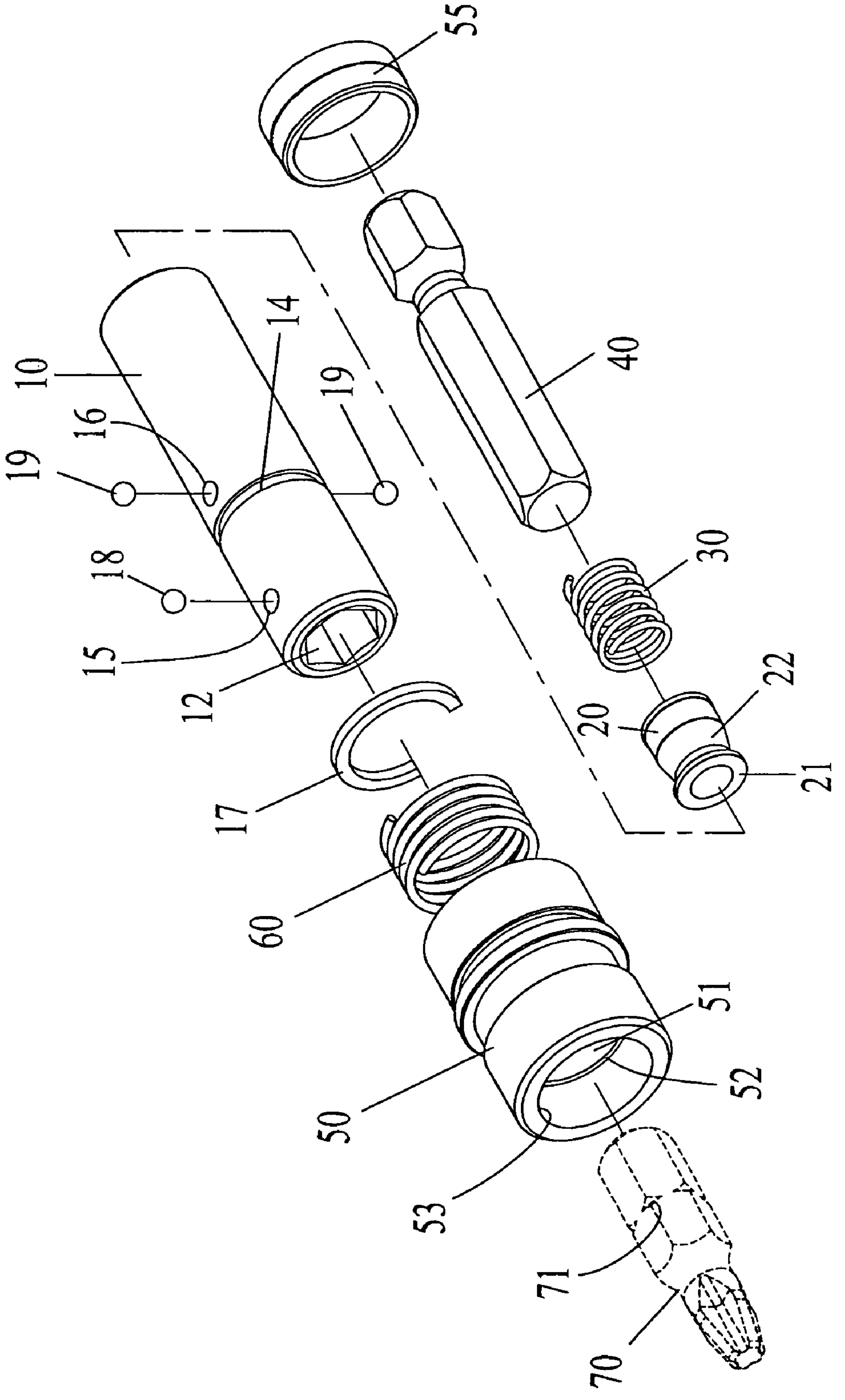
FIG. 1 is an exploded view to show the screw bit positioning device of the present invention.
Figure 2:
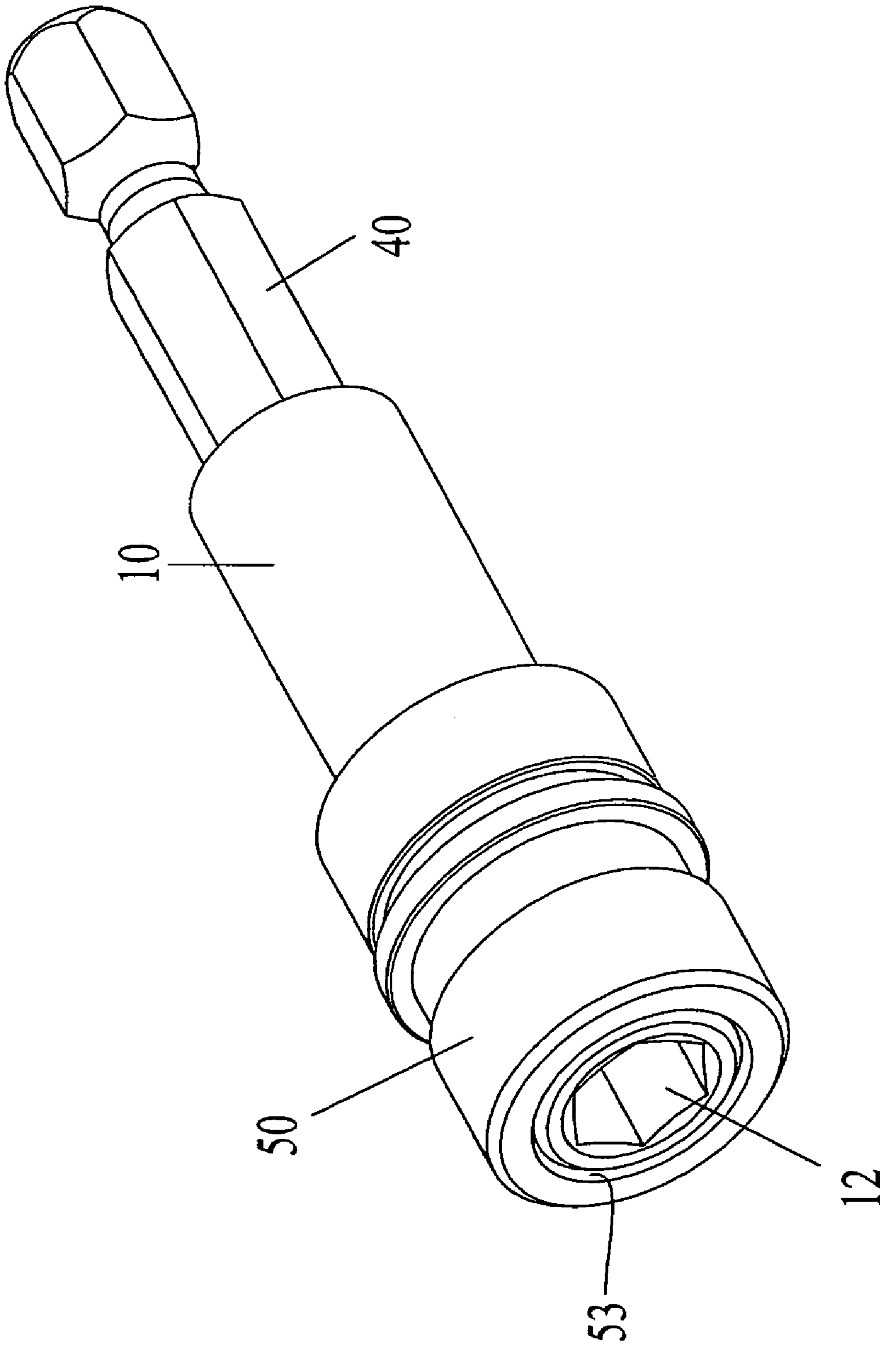
FIG. 2 is a perspective view to show the screw bit positioning device of the present invention.
Figure 3:
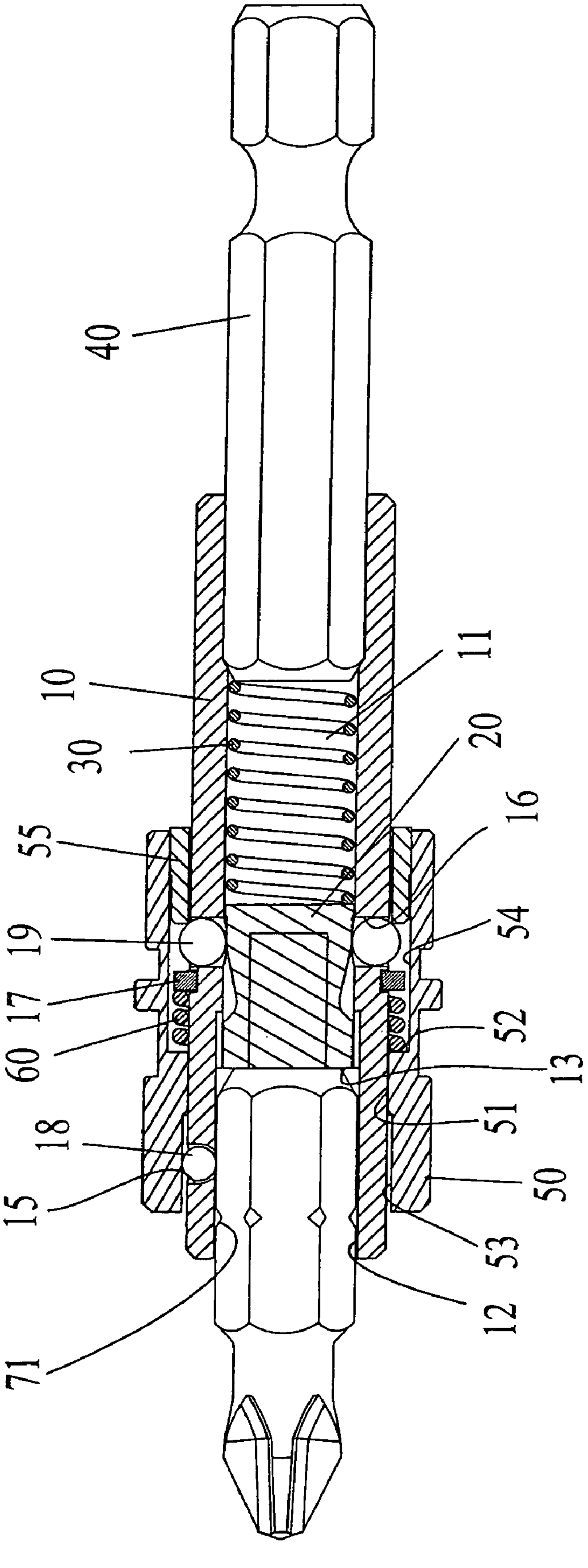
FIG. 3 is a cross sectional view to show that the screw bit is to be positioned by the screw bit positioning device of the present invention.

Referring to FIGS. 1 to 3, the screw bit positioning device of the present invention comprises a tube 10 having a passage 11 defined axially therethrough and a polygonal inner periphery 12 is defined in a first end of the tube 10. The polygonal inner periphery 12 shares a common axis of the axial passage 11 and a screw 70 is engaged with the polygonal inner periphery 12. A first hole 15 and a second hole 16 are respectively defined through a wall of the tube 10. A C-shaped clamp 17 is securely engaged with a first grove 14 defined in an outer periphery of the tube 10 and located between the first and second holes 15, 16. A first bead 18 is movably engaged with the first hole 15 and a second bead 19 is movably engaged with the second hole 16.

A movable member 20 is movably received in the passage 11 and has a magnet 21 received in a first end thereof which faces the first end of the tube 10. A first spring 30 is received in the tube 10 and has a first end contacting a second end of the movable member 20. A second end of the first spring 30 contacts an end of a connection rod 40 inserted into the second end of the tube 10. The connection rod 40 can be connected with a tool which is not shown. The movable member 20 has a second groove 22 defined in an outer periphery thereof. A stop 13 extends inward from an inner periphery of the passage 11 of the tube 10 and has a through hole. The first end of the movable member 20 contacts the stop 13.

A sleeve 50 is movably mounted to the tube 10 and a flange 51 extends from an inner periphery of the sleeve 50 so as to define a first space 53 and a second space 54 between the outer periphery of the tube 10 and the sleeve 50. The first hole 15 communicates with the first space 53 and the second hole 16 communicates with the second space 54. The C-shaped clamp 17 is located in the second space 54 and a second spring 60 is mounted to the tube 10 and biased between the C-shaped clamp 17 and the flange 51. A collar 55 is securely connected to the sleeve 50 and engaged with the second space 54.

Figure 4:
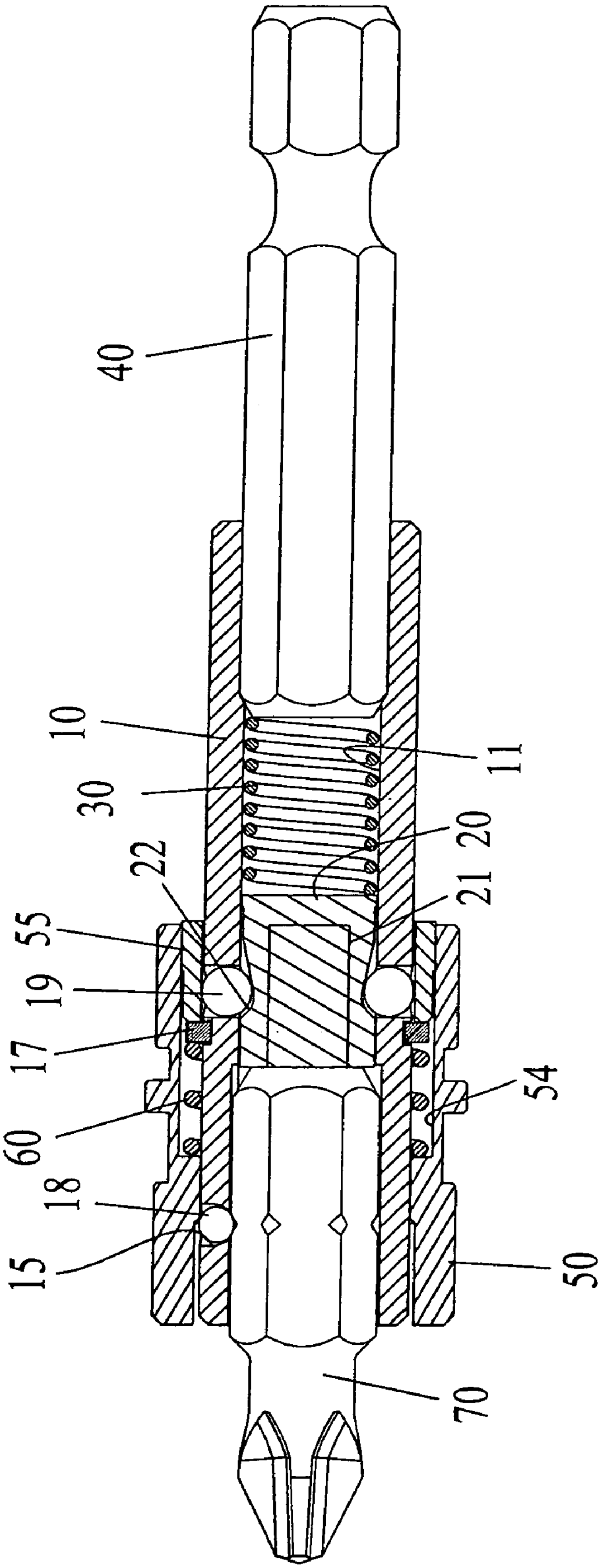
FIG. 4 is a cross sectional view to show that the screw bit is positioned by the screw bit positioning device of the present invention.

When inserting the screw bit 70 into the first end of the tube 10 as shown in FIG. 3, the sleeve 50 is pulled to compress the second spring 60, and the screw bit 70 is magnetically attracted by the magnet 21 in the movable member 20 to be initially positioned. When the sleeve 50 is pulled, the first and second beads 18, 19 are pushed outward by the screw bit 70 and the outer periphery of the movable member 20. The user then inserts the screw bit 70 continuously to compress the first spring 60. The user then releases the sleeve 50, a third groove 71 defined in the screw bit 70 is engaged with the first bead 18 which is pushed inward by the flange 51, and the movable member 20 is pushed by the screw bit 70 and the first groove 22 is engaged with the second bead 19 which is pushed inward by the collar 55 as shown in FIG. 4. Therefore, the screw bit 70 is well positioned.

When the screw bit 70 is to be released, the user pulls the sleeve 50 again and the first and second beads 18 and 19 are partially received in the first and second spaces 53, 54. The movable member 20 and the screw bit 70 are then pushed by the first spring 30, the screw bit 70 is pushed out from the tube 10 by the first spring 30.

While we have shown and described the embodiment in accordance with the present invention, it should be clear to those skilled in the art that further embodiments may be made without departing from the scope of the present invention.

What is claimed is:

1. A screw bit positioning device comprising:

a tube having a passage defined axially therethrough and a polygonal inner periphery defined in a first end of the tube so as to be adapted to engage a screw with the polygonal inner periphery, the polygonal inner periphery sharing a common axis of the axial passage, a first hole and a second hole respectively defined through a wall of the tube, a C-shaped clamp securely mounted on the tube and located between the first and second holes, a first bead movably engaged with the first hole and a second bead movably engaged with the second hole, a stop extending inward from an inner periphery of the passage of the tube and has a through hole;

a movable member movably received in the passage and having a first end facing the first end of the tube, the first end of the movable member contacting the stop, a first spring received in the tube and having a first end contacting a second end of the movable member, a second end of the first spring contacting an end of a connection rod inserted into the second end of the tube, the movable member having a groove defined in an outer periphery thereof, and a sleeve movably mounted to the tube and a flange extending from an inner periphery of the sleeve so as to define a first space and a second space, the first hole communicating with the first space and the second hole communicating with the second space, the C-shaped clamp located in the second space and a second spring mounted to the tube and biased between the C-shaped clamp and the flange, a collar securely connected to the sleeve and engaged with the second space.

2. The device as claimed in claim 1, wherein a magnet is received in the first end of the movable member.

* * * * *